United States Patent
Bernal et al.

(10) Patent No.: US 9,940,633 B2
(45) Date of Patent: *Apr. 10, 2018

(54) SYSTEM AND METHOD FOR VIDEO-BASED DETECTION OF DRIVE-AROUNDS IN A RETAIL SETTING

(71) Applicant: Conduent Business Services, LLC, Dallas, TX (US)

(72) Inventors: Edgar A. Bernal, Webster, NY (US); Qun Li, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 997 days.

This patent is subject to a terminal disclaimer.

(21) Appl. No.: 14/280,863

(22) Filed: May 19, 2014

(65) Prior Publication Data
US 2015/0310459 A1  Oct. 29, 2015

Related U.S. Application Data

(60) Provisional application No. 61/984,421, filed on Apr. 25, 2014.

(51) Int. Cl.
*G06Q 30/02* (2012.01)
(52) U.S. Cl.
CPC .............................. *G06Q 30/0201* (2013.01)
(58) Field of Classification Search
None
See application file for complete search history.

(56) References Cited

U.S. PATENT DOCUMENTS

| | | | |
|---|---|---|---|
| 5,465,115 A | 11/1995 | Conrad et al. | |
| 5,581,625 A | 12/1996 | Connell | |
| 5,953,055 A | 9/1999 | Huang et al. | |
| 6,195,121 B1 | 2/2001 | Huang et al. | |
| 6,654,047 B2 | 11/2003 | Iizaka | |
| 7,688,349 B2 | 3/2010 | Flickner et al. | |
| 8,224,028 B1* | 7/2012 | Golan | G06K 9/00778 340/937 |
| 2008/0018738 A1* | 1/2008 | Lipton | G06K 9/00771 348/143 |
| 2012/0319597 A1* | 12/2012 | Park | H05B 37/0227 315/154 |

(Continued)

OTHER PUBLICATIONS http://www.agentvi.com/images/Agent_Vi_-_Retail_Applications.pdf, Video Analytics Applications for the Retail Market, 2014 Agent Video Intelligence Ltd.

(Continued)

*Primary Examiner* — Leland Marcus
(74) *Attorney, Agent, or Firm* — Fay Sharpe LLP

(57) ABSTRACT

A system and method for detection of drive-arounds in a retail setting. An embodiment includes acquiring images of a retail establishment, analyzing the images to detect entry of a customer onto the premises of the retail establishment, tracking a detected customer's location as the customer traverses the premises of the retail establishment, analyzing the images to detect exit of the detected customer from the premises of the retail establishment, and generating a drive-around notification if the customer does not enter a prescribed area or remain on the premises of the retail location for at least a prescribed minimum period of time.

22 Claims, 7 Drawing Sheets

(56) References Cited

U.S. PATENT DOCUMENTS

| | | | | |
|---|---|---|---|---|
| 2013/0258107 A1* | 10/2013 | Delibaltov | ......... | G06K 9/00785 |
| | | | | 348/148 |
| 2013/0265419 A1* | 10/2013 | Bulan | .................... | G08G 1/143 |
| | | | | 348/143 |
| 2014/0161315 A1* | 6/2014 | Ostrovsky-Berman | . | G06T 7/004 |
| | | | | 382/103 |

OTHER PUBLICATIONS http://rogerioferis.com/publications/FerisAVSS07b.pdf, Video Analytics for Retail, A.W. Senior et al.

http://www.scopixsolutions.com/solutions/, 2015 SCOPIX Solutions.

http://www.retailtouchpoints.com/in-store-insights/714-checking-in-on-minority-report-video-analytics-and-hyper-targeting-in-retail, Checking in on "Minority Report" Video Analytics and Hyper-Targeting in Retail, Feb. 3, 2011.

http://www.security.honeywell.com/uk/video/documents/VideoAnalytics_Retail_UK.pdf, Intelligent Video Analytics for: The Retail Applications Market, Honeywell Security, Sep. 2007.

http://www.retailsolutionsonline.com/doc.mvc/Real-Value-In-Video-Analytics-0001, Real Value in Video Analytics?, Jul. 26, 2010.

http://www.retailtouchpoints.com/retail-store-ops/1230--video-analytics-solutions-help-retailers-optimize-customer-service-and-workforce-management-, Video Analytics Solutions Help Retailers Optimize Customer Service and Workforce Management, Dec. 9, 2011.

\* cited by examiner

US 9,940,633 B2

SYSTEM AND METHOD FOR VIDEO-BASED DETECTION OF DRIVE-AROUNDS IN A RETAIL SETTING

CROSS REFERENCE TO RELATED PATENTS AND APPLICATIONS

This application claims priority to and the benefit of the filing date of U.S. Provisional Patent Application Ser. No. 61/984,421, filed Apr. 25, 2014, which application is hereby incorporated by reference.

BACKGROUND

Advances and increased availability of surveillance technology over the past few decades have made it increasingly common to capture and store video footage of retail settings for the protection of companies, as well as for the security and protection of employees and customers. This data has also been of interest to retail markets for its potential for data-mining and estimating consumer behavior and experience to aid both real-time decision making and historical analysis. For some large companies, slight improvements in efficiency or customer experience can have a large financial impact.

Several efforts have been made at developing retail-setting applications for surveillance video beyond well-known security and safety applications. For example, one such application counts detected people and records the count according to the direction of movement of the people. In other applications, vision equipment is used to monitor queues, and/or groups of people within queues. Still other applications attempt to monitor various behaviors within a reception setting.

One industry that is particularly heavily data-driven is fast food restaurants. Accordingly, fast food companies and/or other restaurant businesses tend to have a strong interest in numerous customer and/or store qualities and metrics that affect customer experience, such as dining area cleanliness, table usage, queue lengths, experience time in-store and drive-thru, specific order timing, order accuracy, and customer response.

Modern retail processes are becoming heavily data-driven, and retailers therefore have a strong interest in numerous customer and store metrics such as queue lengths, experience time in-store and/or drive-thru, specific order timing, order accuracy, and customer response. Of particular interest is the detection and diagnosing of abnormal events, particularly those related to customer volumes exceeding the capacity of a store. Such events include queue lengths and waiting times exceeding certain desired thresholds, which may in turn lead to customer dissatisfaction, customer drive-offs (in vehicular queues) and walk-offs (in pedestrian queues), and customer drive-arounds.

Drive-arounds occur when a customer drives into a retail setting with the intention of making a purchase and, upon examination of the existing customer volume (e.g., from parking occupancy or drive-thru queue length), decides to leave the premises. Drive-arounds result in lost sales and in unnecessary added traffic in the premises, as well as potential losses in repeat business. There is currently no automated solution to the detection of these events, since current solutions for operations analytics involve manual annotation often carried out by contractors. Furthermore, other events of interest may not currently be detected at all.

INCORPORATION BY REFERENCE

The following references, the disclosures of which are incorporated herein in their entireties by reference are mentioned:

U.S. patent application Ser. No. 13/964,652, filed Aug. 12, 2013, by Shreve et al., and entitled "Heuristic-Based Approach for Automatic Payment Gesture Classification and Detection";

U.S. patent application Ser. No. 13/933,194, filed Jul. 2, 2013, by Mongeon et al., and entitled "Queue Group Leader Identification";

U.S. patent application Ser. No. 13/973,330, filed Aug. 22, 2013, by Bernal et al., and entitled "System and Method for Object Tracking and Timing Across Multiple Camera Views"; and, U.S. patent application Ser. No. 14/261,013, filed Apr. 24, 2014, by Bernal et al., and entitled "System and Method for Video-Based Determination of Queue Configuration Parameters".

U.S. patent application Ser. No. 14/195,036, filed Mar. 3, 2014, by Li et al., and entitled "Method and Apparatus for Processing Image of Scene of Interest";

U.S. patent application Ser. No. 14/089,887, filed Nov. 26, 2013, by Bernal et al., and entitled "Method and System for Video-Based Vehicle Tracking Adaptable to Traffic Conditions";

U.S. patent application Ser. No. 14/078,765, filed Nov. 13, 2013, by Bernal et al., and entitled "System and Method for Using Apparent Size and Orientation of an Object to improve Video-Based Tracking in Regularized Environments";

U.S. patent application Ser. No. 14/068,503, filed Oct. 31, 2013, by Bulan et al., and entitled "Bus Lane Infraction Detection Method and System";

U.S. patent application Ser. No. 14/050,041, filed Oct. 9, 2013, by Bernal et al., and entitled "Video Based Method and System for Automated Side-by-Side Traffic Load Balancing";

U.S. patent application Ser. No. 14/017,360, filed Sep. 4, 2013, by Bernal et al. and entitled "Robust and Computationally Efficient Video-Based Object Tracking in Regularized Motion Environments";

U.S. Patent Application Publication No. 2014/0063263, published Mar. 6, 2014, by Bernal et al. and entitled "System and Method for Object Tracking and Timing Across Multiple Camera Views";

U.S. Patent Application Publication No. 2013/0106595, published May 2, 2013, by Loce et al., and entitled "Vehicle Reverse Detection Method and System via Video Acquisition and Processing";

U.S. Patent Application Publication No. 2013/0076913, published Mar. 28, 2013, by Xu et al., and entitled "System and Method for Object Identification and Tracking";

U.S. Patent Application Publication No. 2013/0058523, published Mar. 7, 2013, by Wu et al., and entitled "Unsupervised Parameter Settings for Object Tracking Algorithms";

U.S. Patent Application Publication No. 2009/0002489, published Jan. 1, 2009, by Yang et al., and entitled "Efficient Tracking Multiple Objects Through Occlusion";

Azari, M.; Seyfi, A.; Rezaie, A. H., "Real Time Multiple Object Tracking and Occlusion Reasoning Using Adaptive Kalman Filters", Machine Vision and Image Processing (MVIP), 2011, 7th Iranian, pages 1-5, Nov. 16-17, 2011.

BRIEF DESCRIPTION

According to one aspect, a method for detection of drive-arounds in a retail setting comprises acquiring images of a retail establishment, analyzing the images to detect entry of a customer onto the premises of the retail establishment, tracking a detected customer's location as the customer traverses the premises of the retail establishment, analyzing the images to detect exit of the detected customer from the premises of the retail establishment, and generating a drive-around notification if the customer does not enter a prescribed area or remain on the premises of the retail location for at least a prescribed minimum period of time.

The customer can include a customer within a vehicle, and the analyzing and tracking can include analyzing and tracking a vehicle on the premises of the retail establishment. The images of the retail establishment can include images of a parking lot of the retail establishment including one or more parking spaces for vehicles, and the prescribed area can include the one or more parking spaces. The method can further comprise monitoring the one or more parking spaces to determine whether the detected customer enters a parking space, and discarding the customer as a drive-around candidate if the detected customer enters a parking space. The one or more parking spaces can be previously identified regions within a camera's field-of-view. Alternatively, automated or semi-automated methods for identification of parking space locations can be implemented, as taught in U.S. patent application Ser. No. 13/433,809 entitled "Method of Determining Parking Lot Occupancy from Digital Camera Images," filed Mar. 29, 2012, by Diana Delibaltov et al.

The images of the retail establishment can include images of a drive-thru queue of the retail establishment, and the prescribed area can include the drive-thru queue. The method can further comprise monitoring the drive-thru queue to determine whether the detected customer enters the drive-thru queue, and discarding the customer as a drive-around candidate if the detected customer enters either a parking space. The drive-thru queue can include a static queue region previously identified within a camera's field of view. The drive-thru queue can include an automatically detected dynamic queue region.

The method can further comprise calculating the total time the detected customer is on the premises, comparing the calculated time to a threshold time, and generating the notification only if the calculated time does not exceed the threshold time. The steps of the method can be performed in real-time, and/or using one or more computer vision techniques.

In accordance with another aspect, a system for detection of customer drive-arounds in a retail setting comprises a device for monitoring customers including a memory in communication with a processor configured to acquire a series of images of a retail establishment, analyze the images to detect entry of a customer onto the premises of the retail establishment, track a detected customer's location as the customer traverses the premises of the retail establishment, analyze the images to detect exit of the detected customer from the premises of the retail establishment, and generate a drive-around notification if the customer does not enter a prescribed area or remain on the premises of the retail location for at least a prescribed minimum period of time.

The customer can include a vehicle, and the analyzing and tracking can include analyzing and tracking the vehicle on the premises of the retail establishment. The images of the retail establishment can include images of a parking lot of the retail establishment including one or more parking spaces for vehicles, and the prescribed area can include the one or more parking spaces. The processor can be further configured to monitor the one or more parking spaces to determine whether the detected customer enters a parking space, and discard the customer as a drive-around candidate if the detected customer enters a parking space. The one or more parking spaces can be previously identified regions within a camera's field-of-view.

The images of the retail establishment can include images of a drive-thru queue of the retail establishment, and the prescribed area can include the drive-thru queue. The processor can be further configured to monitor the drive-thru queue to determine whether the detected customer enters the drive-thru queue, and discard the customer as a drive-around candidate if the detected customer enters either a parking space. The drive-thru queue can include a static queue region previously identified within a camera's field of view. The drive-thru queue can include an automatically detected dynamic queue region.

The processor can be further configured to calculate the total time the detected customer is on the premises, compare the calculated time to a threshold time, and generate the notification only if the calculated time does not exceed the threshold time. The processor can be configured to generate the notification in real-time as images are acquired and/or perform at least one computer vision technique.

BRIEF DESCRIPTION OF THE DRAWINGS

FIG. 5A shows a vehicle being tracked, while FIG. 5B shows the vehicle occupying a parking spot and the parking indicator for that parking spot having been updated.

DETAILED DESCRIPTION

The present disclosure relates to a system and method for video-based detection of drive-arounds in vehicular queues performed on an ensemble of images or a video sequence. Herein, the term "drive-around" refers to instances when a customer drives into a retail setting with the intention of making a purchase and, upon examination of the existing customer volume (e.g., from parking occupancy or drive-thru queue length), decides to leave the premises. Additionally, the terms "incoming frame" and/or "current frame" refer to a video frame that is currently being processed for foreground/motion detection, tracking, object recognition, and other video analytics and computer vision processes. This processing can be focused on a region of interest ("ROI") within the frame.

Figure 1:
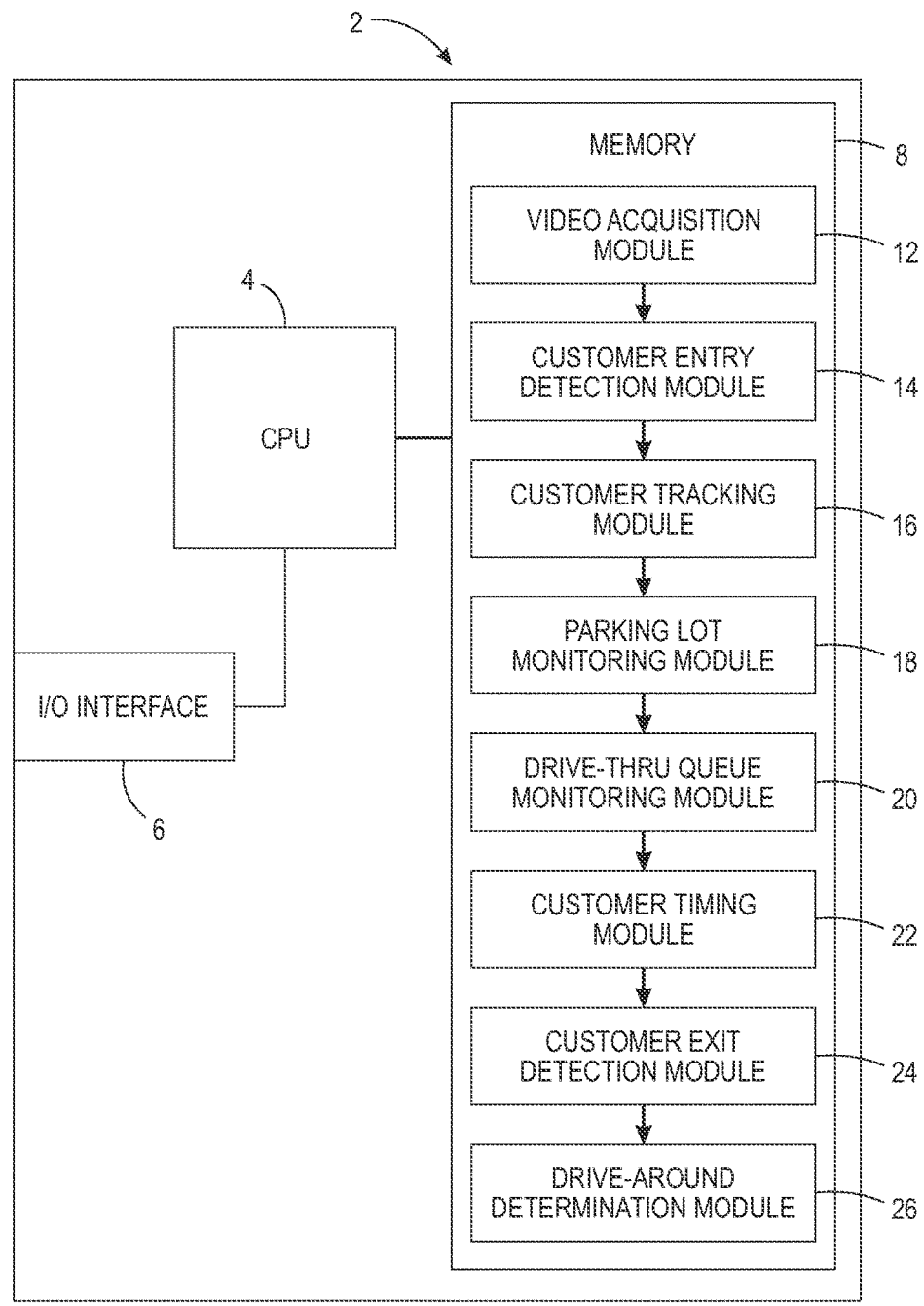
FIG. 1 is a block diagram of a drive-around determination system according to an exemplary embodiment of the present disclosure.

With reference to FIG. 1, the present disclosure describes a method and system 2 for automated video-based detection of vehicular drive-arounds in retail settings. The system 2 and method can be integrated with drive-thru and in-store customer tracking and timing systems, or can be provided as a stand-alone system.

The system 2 includes a CPU 4 that is adapted for controlling an analysis of video data received by the system 2. An I/O interface 6 is provided, such as a network interface for communicating with external devices. The I/O interface 6 may include, for example, a modem, a router, a cable, and and/or Ethernet port, etc. The system 2 includes a memory containing a number of modules containing computer executable instructions. The modules include:

a video acquisition module 12 which acquires video from the retail setting of interest;

a customer entry detection module 14 which determines when a customer enters the retail store premises;

a customer tracking module 16 which determines the location of detected customers as they traverse the retail store premises;

a parking lot monitoring module 18 which determines whether the customer occupies a parking spot;

a drive-thru queue monitoring module 20 which determines whether the customer enters the queue based on the queue configuration and tracking information output by the customer tracking module 16;

a customer timing module 22 which determines the length of the stay of the customer in the premises;

a customer exit detection module 24 which determines when a customer exits the retail store premises; and a drive-around determination module 26 which detects the occurrence of a customer drive-around and issues an alert.

It will be appreciated that the memory 8 may represent any type of tangible computer readable medium such as random access memory (RAM), read only memory (ROM), magnetic disk or tape, optical disk, flash memory, or holographic memory. In one embodiment, the memory 8 comprises a combination of random access memory and read only memory. The CPU 4 can be variously embodied, such as by a single-core processor, a dual-core processor (or more generally by a multiple-core processor), a digital processor and cooperating math coprocessor, a digital controller, or the like. The CPU, in addition to controlling the operation of the system 2, executes instructions stored in memory 8 for performing the parts of the system and method outlined in FIG. 1. In some embodiments, the CPU 4 and memory 8 may be combined in a single chip. It will be appreciated that aspects of the present disclosure can be performed, executed, or otherwise carried out using a wide range of hardware.

Modules 14, 16, 18, 20, 22, and 24 generally process the video acquired by module 12 to compute their respective outputs. Module 26 uses the outputs from those previous modules to make the determination regarding a drive-around. Each module is discussed in detail below.

Video Acquisition Module 12

The video acquisition module 12 includes at least one, but possibly multiple video cameras that acquire video of the region of interest, including the retail store premises and its surroundings. The type of cameras could be of any of a variety of surveillance cameras suitable for viewing the region of interest and operating at frame rates sufficient to view the queue events of interest, such as common RGB cameras that may also have a "night mode", and operate at 30 frame/sec, for example. The cameras can include near infrared (NIR) capabilities at the low-end portion of a near-infrared spectrum (700 nm-1000 nm). No specific requirements are needed regarding spatial or temporal resolutions. The image source, in one embodiment, can include a surveillance camera with a video graphics array size that is about 1280 pixels wide and 720 pixels tall with a frame rate of thirty (30) or more frames per second.

In one embodiment, the video acquisition module 12 can be a device adapted to relay and/or transmit the video captured by the camera to the customer entry detection tracking module 14. The video acquisition module 12 can include a camera sensitive to visible light or having specific spectral sensitivities, a network of such cameras, a line-scan camera, a computer, a hard drive, or other image sensing and storage devices. In another embodiment, the video acquisition module 12 may acquire input from any suitable source, such as a workstation, a database, a memory storage device, such as a disk, or the like. The video acquisition module 12 is in communication with the CPU 4, and memory 8.

Figure 2:
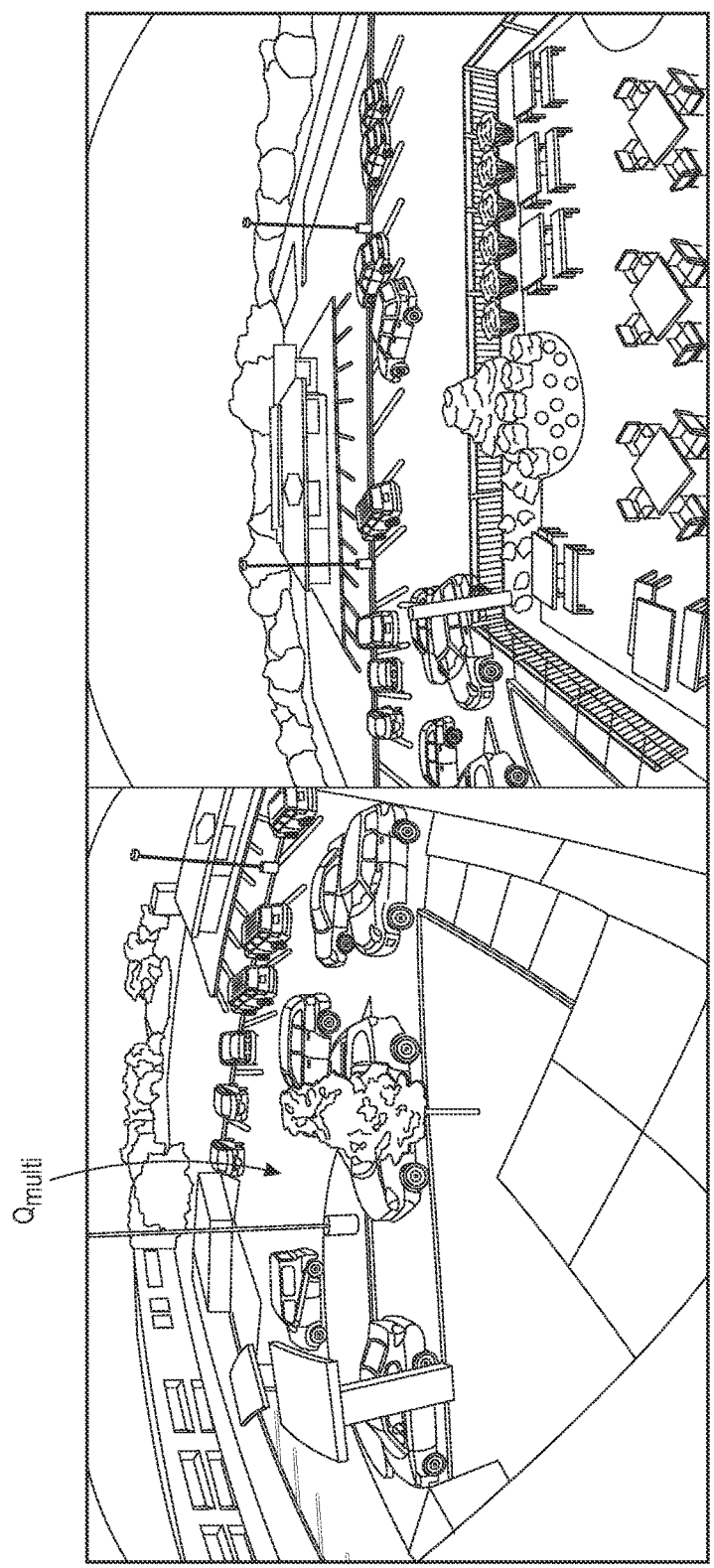
FIG. 2 shows an example scenario of a multi-lane queue being monitored by two cameras of a multi-camera network, where vehicles are supposed to form in a single file before the 'split point', and then split into two separate queues, one for each order point.
Figure 4:
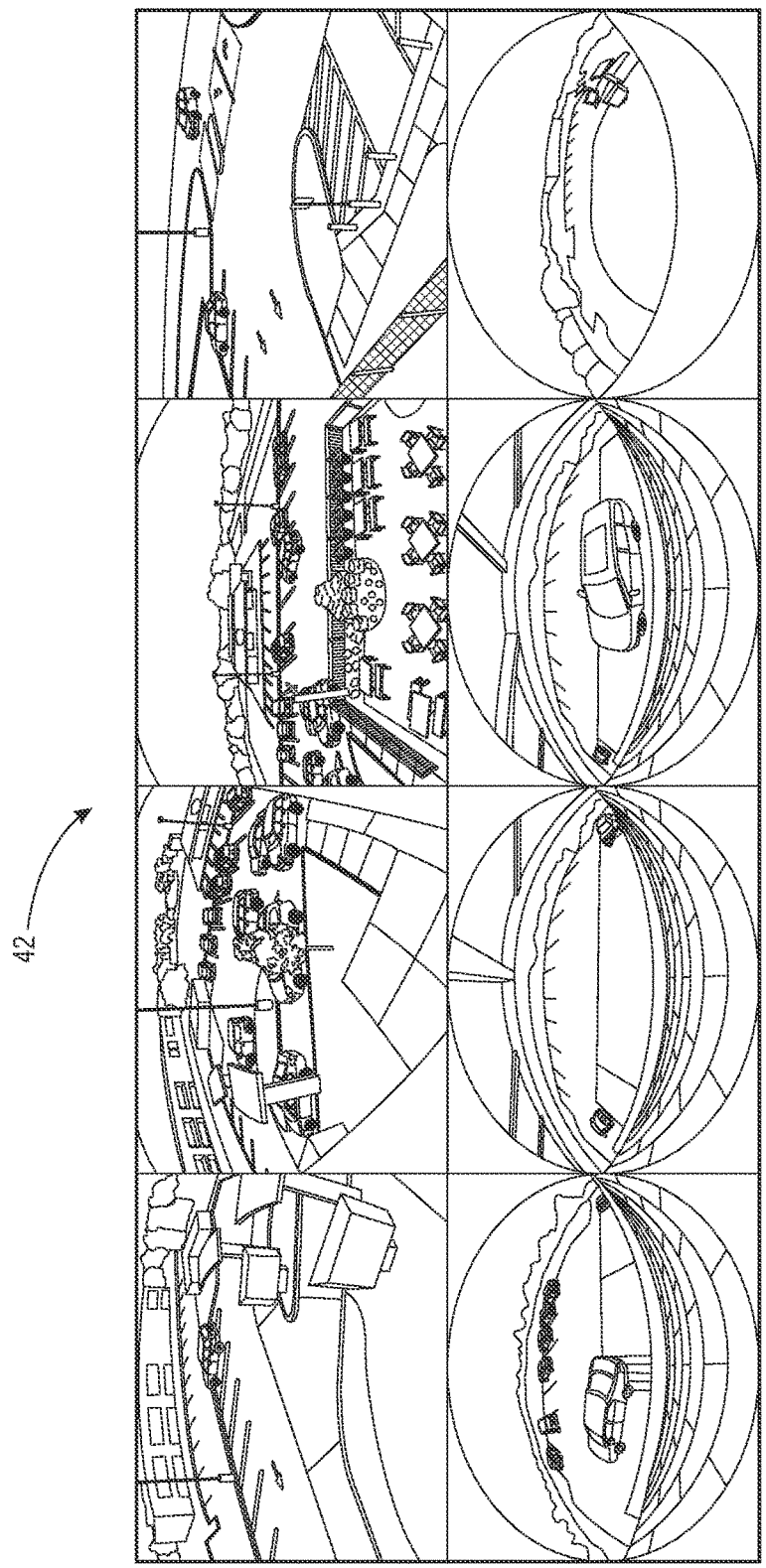
FIG. 4 shows an example set of camera views of the retail premises being monitored with a network of cameras.

FIG. 2 shows two sample frames of videos captured with two cameras which include a vehicular multi-lane queue $Q_{multi}$ at a fast-food restaurant, and are used in the following exemplary disclosure. FIG. 4 shows images from 8 cameras used to cover most of the real estate associated with the exemplary retail premises. Image data from these cameras can be fed to the image acquisition module, and processed in accordance with the present disclosure.

Customer Entry Detection Module 14

Figure 3:
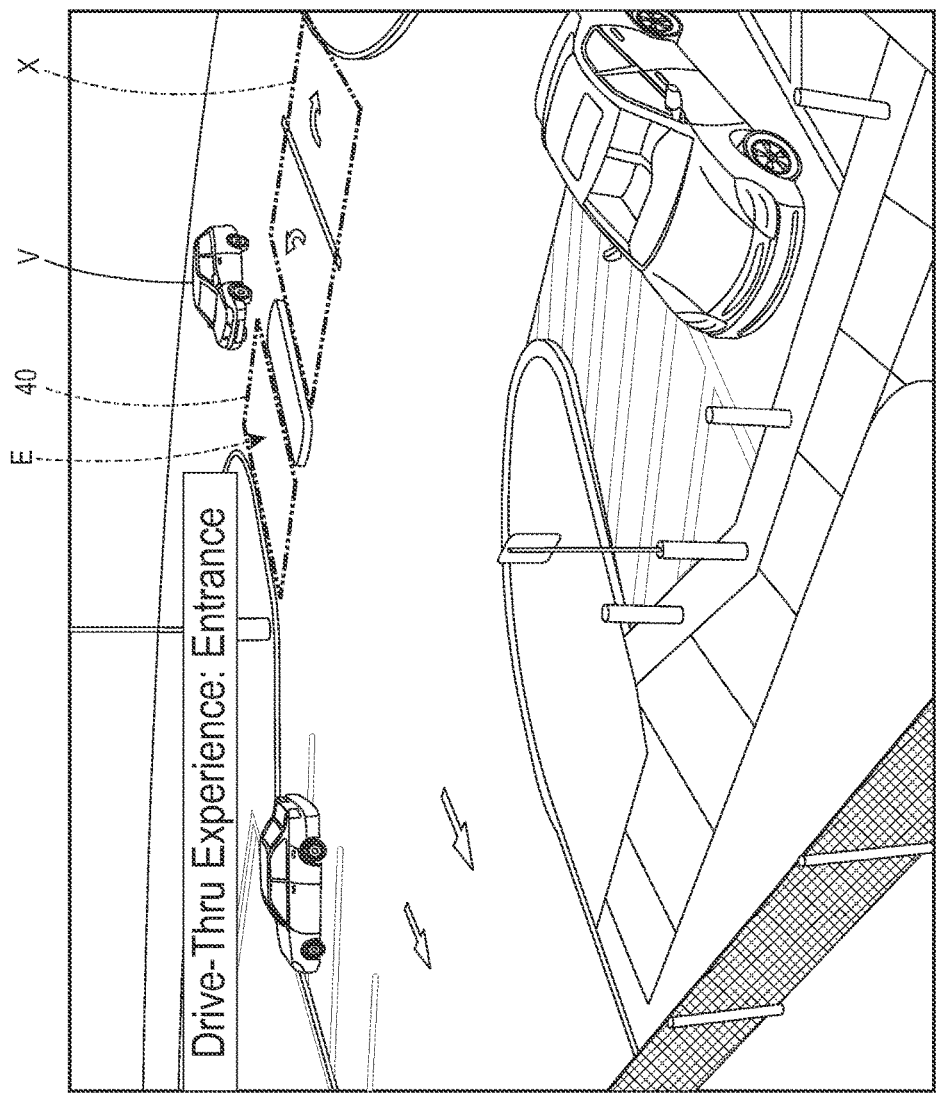
FIG. 3 shows an example scenario of an entrance point into the retail premises being monitored.

The customer entry detection module 14 determines whether a customer (e.g., a vehicle, a pedestrian, etc.) has entered the retail business premises. This module generally includes a video- or image-based object detector placed adjacent to the entrance points to the retail business premises. FIG. 3 shows a sample frame of a camera pointed towards one of the entrances E of the exemplary restaurant being monitored, along with the manually selected image area (dashed line box on left identified generally by reference numeral 40) where entrance events are detected. Customer entry detection module 14 operates by detecting an initial instance of a vehicle V entering the monitored premises.

In one embodiment, a background estimation method that allows for foreground detection to be performed is used. According to this approach, a pixel-wise statistical model of historical pixel behavior is constructed for the boxed entrance detection area in FIG. 3, for instance in the form of a pixel-wise Gaussian Mixture Model (GMM). Other statistical models can be used, including running averages and medians, non-parametric models, and parametric models having different distributions. The GMM describes statistically the historical behavior of the pixels in the highlighted area; for each new incoming frame, the pixel values in the area are compared to their respective GMM and a determination is made as to whether their values correspond to the observed history. If they don't, which happens, for example, when a car traverses the detection area, a foreground detection signal is triggered. When a foreground detection signal is triggered for a large enough number of pixels, a vehicle detection signal is triggered. Morphological operations usually accompany pixel-wise decisions in order to filter out noises and to fill holes in detections.

Alternative implementations for this module include motion detection algorithms that detect significant motion in the detection area. Motion detection is usually performed via temporal frame differencing and morphological filtering. This, in contrast to foreground detection, which also detects stationary foreground objects, motion detection only detects objects in motion at a speed determined by the frame rate of the video and the video acquisition geometry. In other embodiments, computer vision techniques for object recognition and localization can be used on still frames.

These techniques typically entail a training stage where the appearance of multiple labeled sample objects in a given feature space (e.g., Harris Corners, SIFT, HOG, LBP, etc.) is fed to a classifier (e.g., support vector machine—SVM, neural network, decision tree, expectation-maximization—EM, k nearest neighbors—k-NN, other clustering algorithms, etc.) that is trained on the available feature representations of the labeled samples. The trained classifier is then applied to features extracted from image areas adjacent to the entrance points to the retail business premises from frames of interest and outputs the parameters of bounding boxes (e.g., location, width and height) surrounding the matching candidates. In one embodiment, the classifier can be trained on features of vehicles (positive samples) as well as features of asphalt, grass, pedestrians, etc. (negative features). Upon operation of the trained classifier, a classification score on an image test area of interest is issued indicating a matching score of the test area relative to the positive samples. A high matching score would indicate detection of a vehicle.

Customer Tracking Module 16

Using the acquired video as input information, video processing is used to track customers within the area of interest. Upon the detection of entry of a customer by the customer entry detection module 14, the customer tracking module 16 initiates a tracker for the customer and tracks its location in motion across the field of view of the camera(s). Tracking algorithms including point- and global feature-based, silhouette/contour, and particle filter trackers can be used. In one embodiment, a cloud-point-based tracker is used that tracks sets of interest points per vehicle. The customer tracking module 16 outputs spatio-temporal information describing the location of the customers across the range of frames in which they are present within the field of view of the camera(s). Specifically, for each object being tracked, the local tracking module outputs its location in pixel coordinates and the corresponding frame number across the range of frames for which the object remains within the field of view of the camera(s).

Since the area traversed by a vehicle driving around is extensive, customer tracking may need to be performed across multiple camera views. Because the acquired video frame(s) is a projection of a three-dimensional space onto a two-dimensional plane, ambiguities can arise when the subjects are represented in the pixel domain (i.e., pixel coordinates). These ambiguities are introduced by perspective distortion, which is intrinsic to the video data. In the embodiments where video data is acquired from more than one camera (each associated with its own coordinate system), apparent discontinuities in motion patterns can exist when a subject moves between the different coordinate systems. These discontinuities make it more difficult to interpret the data.

In one embodiment, these ambiguities can be resolved by performing a geometric transformation by converting the pixel coordinates to real-world coordinates. Particularly in a case where multiple cameras cover the entire queue area, the coordinate systems of each individual camera are mapped to a single, common coordinate system. For example, the spatial coordinates corresponding to the tracking data from a first camera can be mapped to the coordinate system of a second camera. In another embodiment, the spatial coordinates corresponding to the tracking data from multiple cameras can be mapped to an arbitrary common coordinate system. Any existing camera calibration process can be used to perform the estimated geometric transformation. One approach is described in the disclosure of co-pending and commonly assigned U.S. application Ser. No. 13/868,267, entitled "Traffic Camera Calibration Update Utilizing Scene Analysis," filed Apr. 13, 2013 by, Wencheng Wu, et al., the content of which is totally incorporated herein by reference. While calibrating a camera can require knowledge of the intrinsic parameters of the camera, the calibration required herein need not be exhaustive to eliminate ambiguities in the tracking information. For example, a magnification parameter may not need to be estimated.

In addition to within camera tracking techniques, tracking across cameras requires object re-identification to be performed. Re-identification refers to the task of establishing correspondences of images of a given object across multiple camera views. In one embodiment, color-based re-identification is used because it has been found to be most robust to the drastic changes in perspective and distortion a vehicle experiences as it traverses a typical camera network, as illustrated in FIG. 4, which shows images 42 from eight (8) cameras used to cover most of the real estate associated with the exemplary retail premises. Other features that remain unchanged across different camera views can be used to track subjects across different camera views. These features can include biometric features, clothing patterns or colors, license plates, vehicle make and model, etc. Further details of tracking across multiple camera views are set forth in commonly-assigned U.S. patent application Ser. No. 13/973, 330 filed on Aug. 22, 2013, entitled SYSTEM AND METHOD FOR OBJECT TRACKING AND TIMING ACROSS MULTIPLE CAMERA VIEWS, which application is incorporated by reference in its entirety.

Parking Lot Monitoring Module 18

Figure 5A:
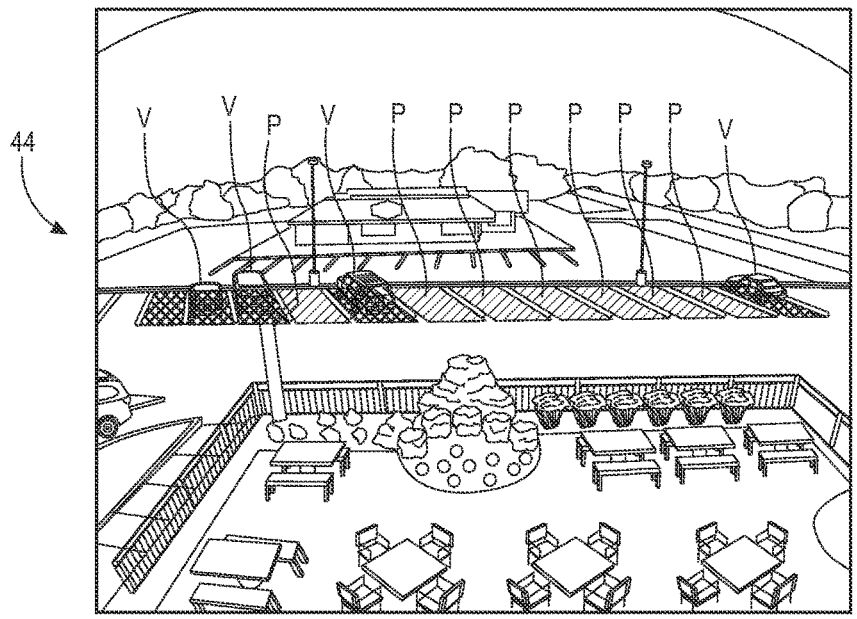
FIGS. 5A and 5B show two video frames where parking occupancy is marked.
Figure 5B:
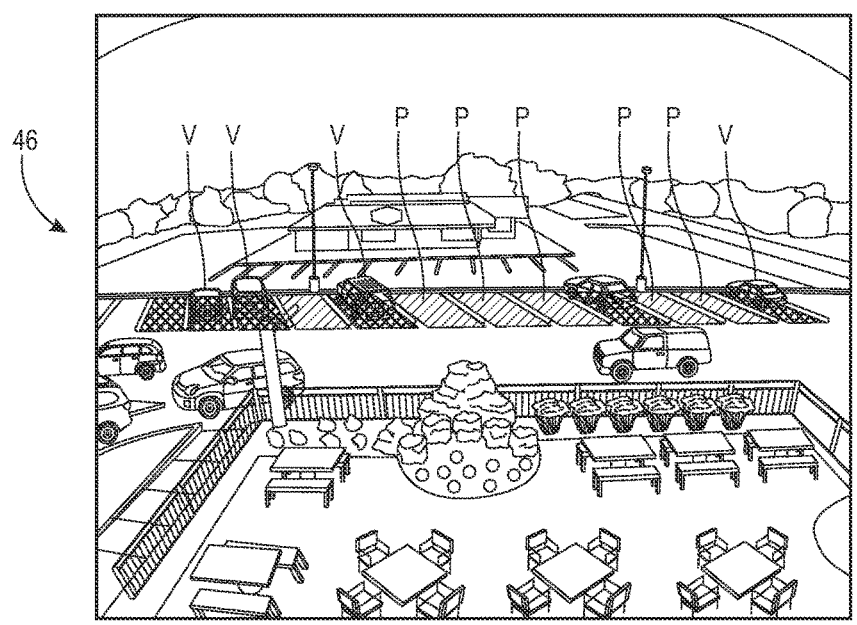

One of the criteria to discard a detected vehicle as a candidate for drive-around is to determine that it enters a parking spot. The parking lot monitoring module 18 determines whether the detected/tracked customer enters a parking spot. With reference to FIGS. 5A and 5B, in one embodiment parking monitoring is performed by manually labeling areas (see hatched areas without cars present, labeled P) corresponding to parking spots and detecting, via the output of the tracking module, whether a vehicle enters one of these areas (see cross-hatched areas with cars present, labeled V).

FIGS. 5A and 5B show two video frames 44 and 46 where parking occupancy is indicated. FIG. 5A shows a vehicle being tracked, while FIG. 5B shows the vehicle occupying a parking spot and the parking indicator for that parking spot having been updated. Approaches for determining parking occupancy from video and images are provided in co-pending and commonly assigned U.S. Ser. No. 13/922,336, entitled "A Method for Detecting Large Size and Passenger Vehicles from Fixed Cameras," filed Jun. 20, 2013, by Orhan Bulan, et al.; U.S. patent application Ser. No. 13/835, 386, entitled "Two-Dimensional and Three-Dimensional Sliding Window-Based Methods and Systems for Detecting Vehicles," filed Mar. 5, 2013, by Orhan Bulan, et al., "A System and Method for Available Parking Space Estimation for Multispace On-Street Parking," filed Apr. 6, 2012, by Orhan Bulan, et al.; U.S. patent application Ser. No. 13/433, 809 entitled "Method of Determining Parking Lot Occupancy from Digital Camera Images," filed Mar. 29, 2012, by Diana Delibaltov et al.; and U.S. patent application Ser. No. 13/441,294 entitled "Video-based detector and notifier for short-term parking violation enforcement," filed Apr. 6, 2012, all of which are totally incorporated herein by reference.

Drive-Thru Queue Monitoring Module 20

Figure 6:
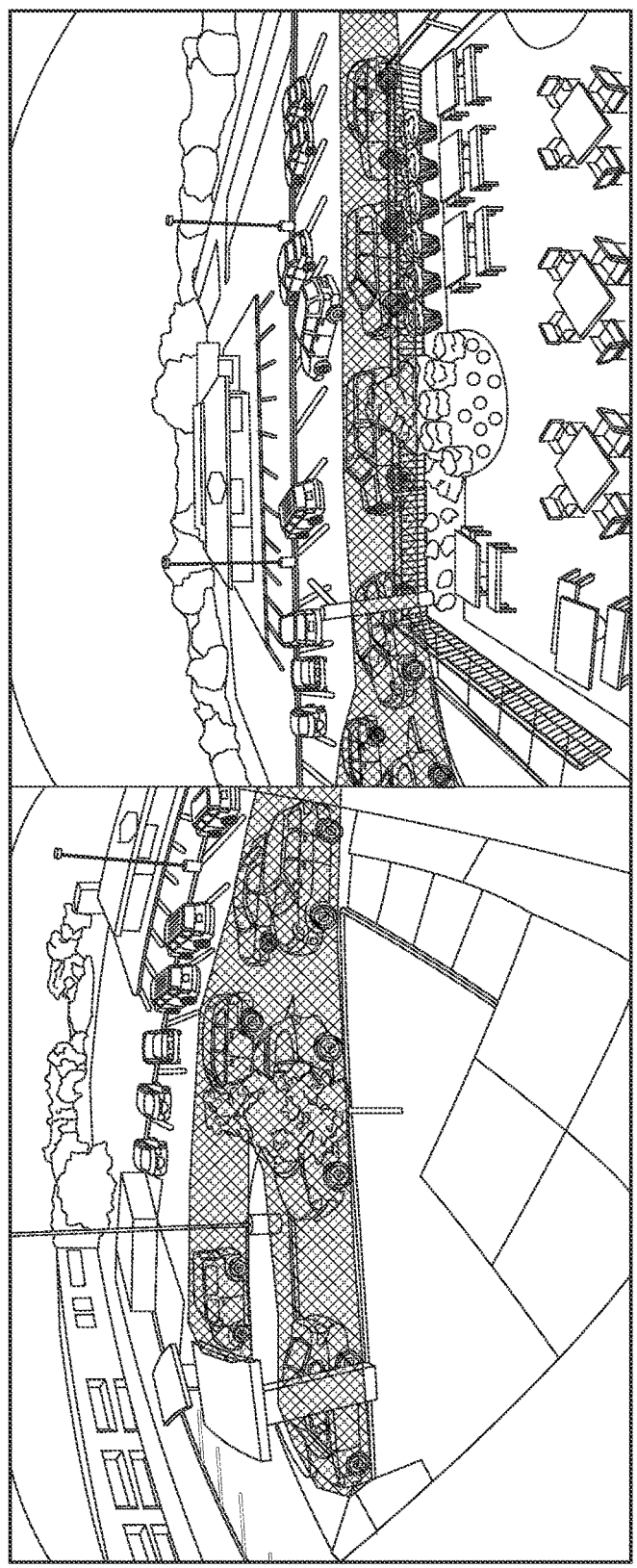
FIG. 6 illustrates one example output of a queue monitoring module in accordance with the present disclosure.

Another criteria to discard a vehicle as a candidate for a drive-around is to determine that the vehicle enters the drive-thru queue. The drive-thru monitoring module 20 determines whether the customer enters the queue. One approach for determining a queue configuration is provided in co-pending and commonly assigned U.S. patent application Ser. No. 14/261,013, entitled "System and Method for Video-Based Determination of Queue Configuration," filed Apr. 24, 2014 by, Edgar A. Bernal, et al., the content of which is totally incorporated herein by reference. In one contemplated embodiment, vehicles that are located in that queue configuration can be discarded. FIG. 6 illustrates one example output of a queue monitoring module 20 in accordance with the present disclosure. The cross-hatched areas comprise the drive-thru queue.

The drive-thru queue monitoring module 20 extracts queue-related parameters. Generally, the queue-related parameters can vary between applications. The parameters which the module 20 extracts can be based on their relevance to the task at hand. Examples of queue-related parameters include, but are not limited to, a split point location, queue length, queue width, any imbalance in side-by-side order point queues, queue outline/boundaries, and statistics of queue times/wait periods, etc.

In one contemplated embodiment, for example, the module 20 can extract the boundary of the queue configuration. Based on the estimated queue boundary, determinations as to whether a given subject (e.g., vehicle) forms part of a queue or leaves a queue can be made. Detection of a vehicle (e.g., customer) entering a queue can be performed by comparing the location of the vehicle given its corresponding tracking information with the detected queue outline. If the estimated vehicle location is inside the confines of the queue as defined by the estimated outline, a vehicle may be deemed to have joined the queue. In some embodiments, a decision as to whether a vehicle joined a queue can be made after a certain number of frames the vehicle position is detected to be within the confines of the queue. In addition to purely spatial information, other types of data can be used to make the determination process more robust. For example, if the speed and the direction of motion of a vehicle are significantly different from that of vehicles still in the queue, then the vehicle can be deemed not to be part of the queue.

One aspect of automatically detecting queue dynamics is that the data can aid businesses in making informed decisions aimed at improving customer throughput rates, whether in real-time or for the future. Similarly, histories of queue-related parameters, and their correlation with abnormal events, (such as vehicle drive-offs, drive-bys, drive-arounds at a drive-thru queue area, or walk-offs in a pedestrian queue) and other anomalous incidents can shed light into measures the business can take to avoid a reoccurrence of these undesired events.

There is no limitation made herein to the type of business or the subject (such as customers and/or vehicles) being monitored in the queue area. The embodiments contemplated herein are amenable to any application where subjects can wait in queues to reach a goods/service point. Non-limiting examples, for illustrative purposes only, include banks (indoor and drive-thru teller lanes), grocery and retail stores (check-out lanes), airports (security check points, ticketing kiosks, boarding areas and platforms), road routes (i.e., construction, detours, etc.), restaurants (such as fast food counters and drive-thrus), theaters, and the like, etc.

The queue configuration and queue-related parameter information computed by the present disclosure can aid these applications.

The drive-thru queue monitoring module 20, in concert with the customer tracking module 16 detects events of customers joining a queue through tracking of a customer. If a vehicle is detected entering a queue, then it can be discarded as a drive-around candidate.

Customer Timing Module 22

Another criteria to discard a vehicle as a candidate for a drive-around is to determine that the length of stay of the vehicle in the premises exceeds a predetermined threshold. It will be appreciated that a decision regarding drive-around can be confidently made based on the outputs of the parking and queue monitoring modules 18 and 20. However, the Customer Timing Module 22 can serve as an additional indicator to decrease false positives. Also, timing information can be seamlessly extracted from tracking information, so this module generally does not impose a significant added computational load. Specifically, if the frame rate f in frames per second of the video acquired by the Video Acquisition Module 12 and the number of frames N a vehicle has been tracked are known, then the length of time the vehicle has been tracked can be computed as N/f.

Customer Exit Detection Module 24

A determination that a vehicle drove around cannot be made until the customer exits the premises. The customer exit detection module 24 makes this determination. Similar to the customer entry detection module, this module detects the presence of a vehicle in a region associated with an exit point (see dashed line polygon X in FIG. 3, for example). Unlike the entry detection module 14, however, module 24 makes a decision based on the vehicle tracking information provided by the tracking module 16. In that sense, its operation is more closely related to that of the parking monitoring module 18. Specifically, as a trajectory is detected to enter or traverse the exit region, a notification of an exit event associated with the customer being tracked is issued.

Drive-Around Determination Module 26

The drive-around determination module 26 takes the outputs of modules 14, 16, 18, 20, 22 and 24 to make a determination as to whether a vehicle drove around the premises. Specifically, if a detected vehicle was tracked around the premises from an entrance to an exit point, was not determined to join a queue or to occupy a parking spot, and, optionally, stayed in the premises of the retail business for a short length of time relative to a predetermined threshold, a drive-around notification is triggered.

It will be appreciated that the system and method described here performs video processing. A primary application is notification of drive-arounds as they happen (real-time) so that the cause and effects can be mitigated in realtime. Accordingly, such a system and method utilizes real-time processing where alerts can be given within seconds of the event. An alternative approach implements a post-operation review, where an analyst or store manager can review information on the anomalies at a later time to understand store performance. A post operation review would not utilize real-time processing and could be performed on the video data at a later time or place as desired.

Figure 7:
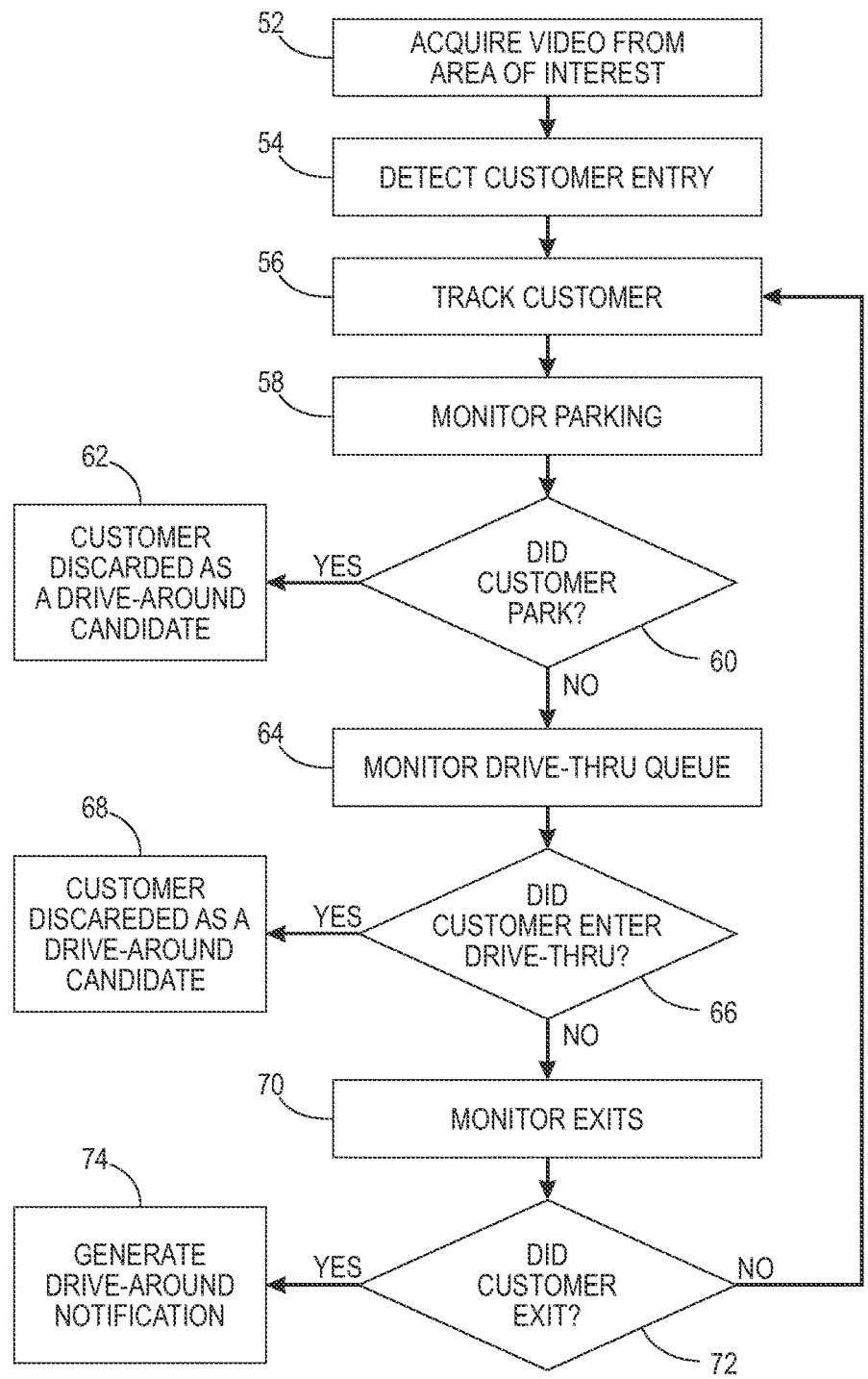
FIG. 7 illustrates a flowchart of an exemplary method in accordance with the present disclosure.

Turning to FIG. 7, an exemplary method 50 in accordance with the present disclosure is illustrated in flowchart form. The method includes acquiring video from an area of interest in process step 52. Next, a customer entry is detected in process step 54, and the customer is tracked in process step 56. A parking lot is monitored in process step 58 and if, in process step 60, the customer enters a parking space, then the method diverts to process step 62 and that customer is discarded as a drive-around candidate. If the customer does not enter a parking space, then it is determined in process steps 64 and 66 whether the customer entered a drive-thru queue. If so, the method diverts to process step 68 and that customer is discarded as a drive-around candidate. If not, the method continues to process step 70 whereat the exits are monitored to determine whether the customer exits the monitored premises at process step 74. If the customer exits the monitored premises, the method diverts to process step 76 where a drive-around notification is generated. Otherwise, the method loops back to the track customer process step 56 and continues until either the customer parks, enters the drive-thru queue, or exits the premises. It will be appreciated that this method is exemplary and that aspects of the method can be carried out in different sequences and/or simultaneously depending on a particular implementation. In addition, the method can be used to monitor a multitude of customers simultaneously.

Although the method is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for detection of drive-arounds in a retail setting comprising:
   acquiring images of a retail establishment from at least two cameras having at least two different fields of view of premises of the retail establishment;
   analyzing the images to detect entry of a customer onto the premises of the retail establishment;
   tracking a detected customer's location as the customer traverses the premises of the retail establishment across the at least two fields of view;
   analyzing the images to detect exit of the detected customer from the premises of the retail establishment; and
   generating a drive-around notification if the customer does not enter a prescribed area or remain on the premises of the retail location for at least a prescribed minimum period of time;
   wherein the analyzing the images includes converting pixel coordinates of each camera to physical coordinates.

2. The method of claim 1, wherein the customer includes a vehicle, and the analyzing and tracking includes analyzing and tracking a plurality of vehicles on the premises of the retail establishment simultaneously.

3. The method of claim 2, wherein the images of the retail establishment include images of a parking lot of the retail establishment including one or more parking spaces for vehicles, and wherein the prescribed area includes the one or more parking spaces, the method further comprising monitoring the one or more parking spaces to determine whether the detected customer enters a parking space, and discarding the customer as a drive-around candidate if the detected customer enters either a parking space.

4. The method of claim 3, wherein the one or more parking spaces are previously identified regions within a camera's field-of-view.

5. The method of claim 2, wherein the images of the retail establishment include images of a drive-thru queue of the retail establishment, and wherein the prescribed area includes the drive-thru queue, the method further comprising monitoring the drive-thru queue to determine whether the detected customer enters the drive-thru queue, and discarding the customer as a drive-around candidate if the detected customer enters either a parking space or the drive-thru queue.

6. The method of claim 5, wherein the drive-thru queue includes a static queue region previously identified within a camera's field of view.

7. The method of claim 5, wherein the drive-thru queue includes an automatically detected dynamic queue region.

8. The method of claim 1, further comprising calculating the total time the detected customer is on the premises, comparing the calculated time to a threshold time, and generating the notification only if the calculated time does not exceed the threshold time.

9. The method of claim 1, wherein the customer includes a pedestrian customer, and the analyzing and tracking includes analyzing and tracking a pedestrian customer on the premises of the retail establishment.

10. The method of claim 1, wherein the steps are performed in real-time.

11. The method of claim 1, wherein the steps are performed using at least one computer vision technique.

12. A system for detection of customer drive-arounds in a retail setting, the system comprising a device for monitoring customers including a memory in communication with a processor configured to:
    acquire a series of images of a retail establishment from at least two cameras having at least two different fields of view of premises of the retail establishment, the fields of view at least partially overlapping;
    analyze the images to detect entry of a customer onto the premises of the retail establishment;
    track a detected customer's location as the customer traverses the premises of the retail establishment across the at least two fields of view;
    analyze the images to detect exit of the detected customer from the premises of the retail establishment; and
    generate a drive-around notification if the customer does not enter a prescribed area or remain on the premises of the retail location for at least a prescribed minimum period of time;
    wherein the analyzing the images includes converting pixel coordinates of each camera to physical coordinates.

13. The system of claim 12, wherein the customer includes a vehicle, and the analyzing and tracking includes analyzing and tracking the vehicle on the premises of the retail establishment.

14. The system of claim 13, wherein the images of the retail establishment include images of a parking lot of the retail establishment including one or more parking spaces for vehicles, and wherein the prescribed area includes the one or more parking spaces, the processor further configured to monitor the one or more parking spaces to determine whether the detected customer enters a parking space, and discard the customer as a drive-around candidate if the detected customer enters a parking space.

15. The system of claim 14, wherein the one or more parking spaces are previously identified regions within a camera's field-of-view.

16. The system of claim 12, wherein the images of the retail establishment include images of a drive-thru queue of the retail establishment, and wherein the prescribed area includes the drive-thru queue, the processor further configured to monitor the drive-thru queue to determine whether the detected customer enters the drive-thru queue, and discard the customer as a drive-around candidate if the detected customer enters either a parking space or the drive-thru queue.

17. The system of claim 16, wherein the drive-thru queue includes a static queue region previously identified within a camera's field of view.

18. The system of claim 16, wherein the drive-thru queue includes an automatically detected dynamic queue region.

19. The system of claim 12, wherein the processor is further configured to calculate the total time the detected customer is on the premises, compare the calculated time to a threshold time, and generate the notification only if the calculated time does not exceed the threshold time.

20. The system of claim 12, wherein the processor is configured to generate the notification in real-time as images are acquired.

21. The system of claim 12, wherein the processor is further configured to perform at least one computer vision technique.

22. The system of claim 12, wherein the customer includes a pedestrian customer, and the analyzing and tracking includes analyzing and tracking the pedestrian customer on the premises of the retail establishment.

* * * * *